United States Patent
Salam et al.

(10) Patent No.: US 9,910,642 B2
(45) Date of Patent: Mar. 6, 2018

(54) OPTIMAL RULE GENERATION FROM A DIGRAPH REPRESENTATION

(71) Applicant: Cisco Technology, Inc., San Jose, CA (US)

(72) Inventors: Samer Salam, Vancouver (CA); Shashi Kumar Bansal, Bangalore (IN); Swaroop Shastri, Balaghat (IN)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/165,369

(22) Filed: May 26, 2016

(65) Prior Publication Data

US 2017/0344346 A1   Nov. 30, 2017

(51) Int. Cl.
  *G06F 9/44* (2006.01)
(52) U.S. Cl.
  CPC .............. *G06F 8/33* (2013.01); *G06F 8/311* (2013.01)
(58) Field of Classification Search
  None
  See application file for complete search history.

(56) References Cited

U.S. PATENT DOCUMENTS

| | | | | |
|---|---|---|---|---|
| 6,654,731 | B1 * | 11/2003 | Mahesh | G06F 17/2795 706/45 |
| 7,493,333 | B2 * | 2/2009 | Hill | G06F 17/30707 |
| 7,496,593 | B2 * | 2/2009 | Gardner | G06F 17/279 |
| 7,505,989 | B2 * | 3/2009 | Gardner | G06F 17/30734 |
| 2004/0133534 | A1 * | 7/2004 | Mahesh | G06F 17/2795 706/50 |
| 2014/0172914 | A1 * | 6/2014 | Elnikety | G06F 17/30979 707/774 |
| 2016/0103706 | A1 * | 4/2016 | Novaes | G06F 9/4881 718/102 |

OTHER PUBLICATIONS

"Visualizing Logical Dependencies in SWRL Rule Bases", Hassanpour et al., RuleMl . . . 2010, LNCS 6403, pp. 259-272, 2010.*
Hassanpour, Saeed, "Axiomé", http://protegewiki.stanford.edu/wiki/Axiom%C3%A9, Dec. 23, 2009, 4 pages, printed Mar. 28, 2016, Mozilla Public License (MPL).

* cited by examiner

Primary Examiner — Daxin Wu
(74) Attorney, Agent, or Firm — Parker Ibrahim & Berg LLC; James M. Behmke; Stephen D. LeBarron (57) ABSTRACT

In one embodiment, a computing system identifies one or more terminal nodes in a digraph, and then back-walks primitives up the digraph from each terminal node to a corresponding parent terminal node or a root of the digraph, whichever is first. The system then identifies chains of back-walked primitives for each of the one or more terminal nodes (e.g., where each chain consists of a respective terminal node and any primitives either a) up to but not including a corresponding parent terminal node or else b) up to and including the root of the digraph when the back-walking reaches the root). Based on this, the system can then merge each set of any two or more chains of the identified chains that intersect on a decision operation into a corresponding new single chain, and maps each of the chains to a respective rule.

20 Claims, 7 Drawing Sheets

OPTIMAL RULE GENERATION FROM A DIGRAPH REPRESENTATION

TECHNICAL FIELD

The present disclosure relates generally to computer programming, and, more particularly, to optimal rule generation from a digraph representation.

BACKGROUND

Automation of expert knowledgebases (e.g., network troubleshooting, diagnostics, and debugging) is a process by which expert knowledge (which today lives in the brains of programmers, engineers, etc.) is captured in digital knowledgebases and encoded using some form of semantic technology (e.g., Resource Description Framework (RDF), Web Ontology Language (OWL), Semantic Web Rule Language (SWRL), etc.). The system must enable the complex workflows to be translated to machine consumable information in a simple way. The end goal being to allow machine reasoners to execute based on those knowledgebases, thereby mechanizing the manual workflows that are carried out manually by the experts today.

One of the main challenges to the adoption of this solution is the ease by which is these detailed and potentially complex interwoven knowledgebases can be constructed for various workflows or algorithms. Currently, the task of authoring the ontology associated with a knowledgebase requires proficiency in SWRL, working knowledge in RDF/OWL in addition to a general understanding of how Semantic Reasoners evaluate rules and perform inference. Even though SWRL offers a declarative language to define rules, there is a learning curve associated with these technologies. The requirement is to be able to allow the domain experts, who may not necessarily have any programming background, to construct knowledgebases for their workflows and algorithms.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a computing system identifies one or more terminal nodes in a digraph, and then back-walks primitives up the digraph from each terminal node to a corresponding parent terminal node or a root of the digraph, whichever is first. The system then identifies chains of back-walked primitives for each of the one or more terminal nodes (e.g., where each chain consists of a respective terminal node and any primitives either a) up to but not including a corresponding parent terminal node or else b) up to and including the root of the digraph when the back-walking reaches the root). Based on this, the system can then merge each set of any two or more chains of the identified chains that intersect on a decision operation into a corresponding new single chain, and maps each of the chains to a respective rule, wherein one or more terminal nodes in each particular chain map to a head of a corresponding rule, and other primitives of the particular chain map to a body of the corresponding rule.

Description

As noted above, automation of expert knowledgebases is a process by which expert knowledge is captured in digital knowledgebases and encoded using some form of semantic technology (e.g., Resource Description Framework (RDF), Web Ontology Language (OWL), Semantic Web Rule Language (SWRL), etc.). One of the main challenges, however, is the ease by which these detailed and potentially complex interwoven knowledgebases can be constructed for various workflows or algorithms.

According to one or more embodiments herein, various techniques may be used for constructing OWL ontologies with SWRL rules from logical flowcharts depicting an algorithm, with complete abstraction of OWL/SWRL from the user. That is, a graphical user interface (GUI) may be provided for constructing OWL ontologies with SWRL by depicting the algorithm graphically using primitives. This illustrative system requires no knowledge of semantic technologies on part of the user, and involves providing a knowledgebase authoring tool with a graphical interface that allows users to define their workflow using a flowchart that depicts the algorithm that they're mechanizing (again, without any knowledge of semantic technologies such as RDF, OWL, SWRL, etc.).

The illustrative knowledgebase capture system is based on the principles of autonomic computing where systems are able to adapt themselves to changes happening in the surrounding environment. As understood by those skilled in this art, one reference model for creating closed adaptation loops is known as "MAPE-K" (Monitor, Analyze, Plan, and Execute based on Knowledge), and a related reference model that emerged is known as "CADA" (Collect, Analyze, Detect and Act). Following these reference frameworks, it is possible to model any algorithm that mechanizes the management or operation of complex distributed computer systems as a chain of MAPE or CADA cycles. Furthermore, it is possible to define a relatively small set of logical primitives that correspond to each stage of the reference model, for e.g.:

Start primitive, marks the starting point of some algorithm;

Parameter primitive, represents some input into the algorithm;

Collection primitive (e.g. that triggers a specific command/CLI/etc.);

Data Element primitive that corresponds to collected data or inferred data;

Operator primitive that allows for performing logical, arithmetic or string manipulations (etc.) over Data Elements; and Conclusion primitive that can, for example, raise an alert to the operator or issue a command to trigger an action.

Using this small set of primitives, it is possible to provide a user interface where each primitive is represented as some graphical element, and those graphical elements can be chained together to construct the algorithm being automated. The illustrative techniques described herein use the CADA (or MAPE) logical primitives, or their proverbial graphical avatars, to automatically generate OWL artifacts and SWRL rules in an ontology. Note that this transformation must generally be symmetric, i.e., starting from the ontology, it must also be possible to render the algorithm graphically using the same set of logical primitives. (Note that the techniques that are described below are merely one embodiment of the transformation function, however, variations thereof are possible.)

Figure 1:
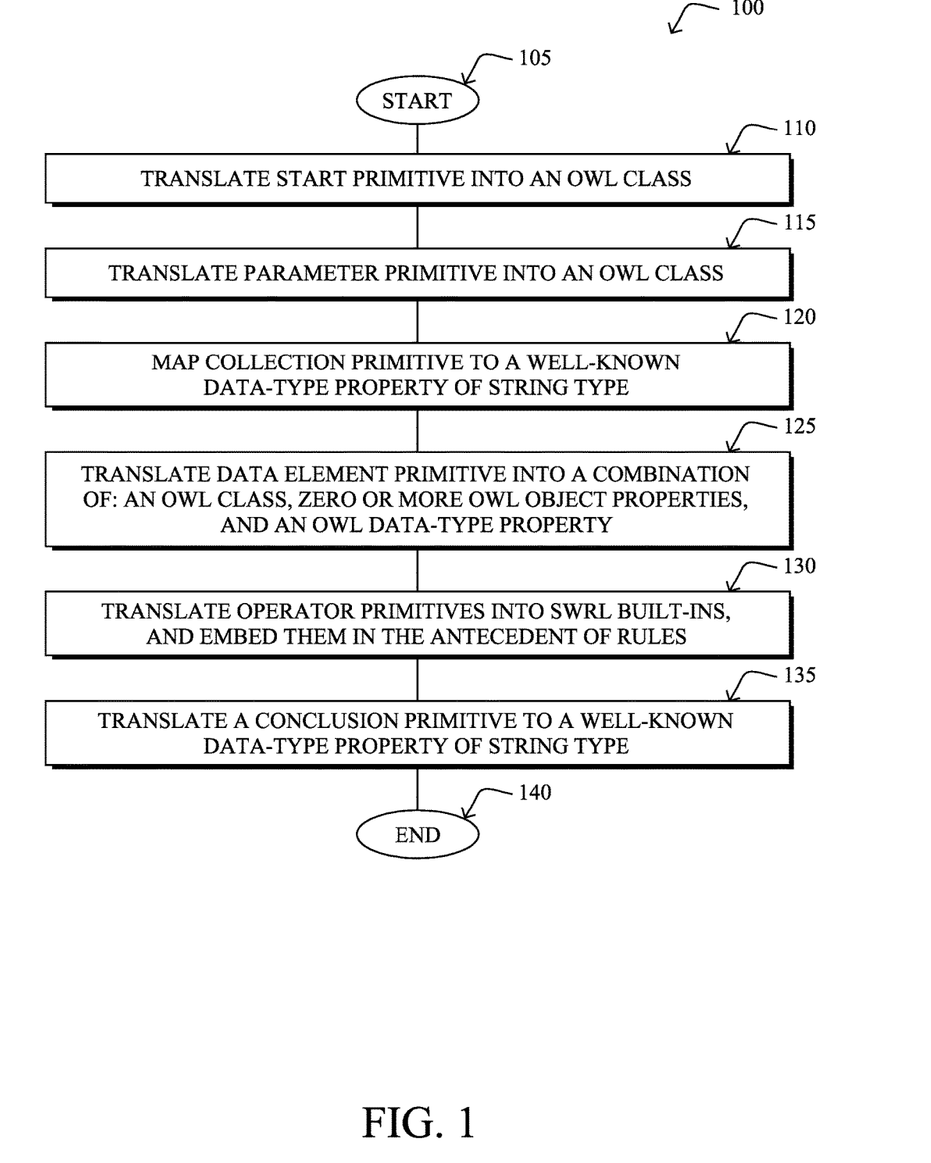
FIG. 1 illustrates an example simplified procedure for a semantic knowledgebase authoring tool for automating computing systems.

FIG. 1 illustrates an example simplified procedure for a semantic knowledgebase authoring tool for automating computing systems in accordance with one or more embodiments described herein. The procedure 100 may start at step 105, and continues to step 110, where a Start primitive is translated into an OWL Class. All Start primitives are defined as sub-classes of the same named OWL Class used to identify algorithm trigger points. Furthermore, a SWRL rule is created for every occurrence of a Start primitive with a Class Atom referencing the corresponding sub-class in the rule's antecedent.

In step 115, a Parameter primitive is translated into an OWL Class as well. All Parameter primitives are defined as sub-classes of the same named OWL Class used to identify inputs to algorithms. In addition, a well-known OWL Data-type Property is defined to capture the value of Parameter instances. A Parameter primitive is embedded into a SWRL rule as a combination of a Class Atom in addition to a Property Atom in the rule(s) antecedent.

Next, in step 120, a Collection primitive is mapped to a well-known Data-type Property of String type. The value of the Property may identify, for example, the command line interface (CLI) command name or the XPath(s) of the data elements (or is managed objects) to be fetched from the network element. The Data-type Property is associated with an OWL Individual that corresponds to the network element from which data is to be collected. Collection primitives are represented as Property Atoms in the conclusions of SWRL rules.

In step 125, a Data Element primitive is translated into a combination of: an OWL Class, zero or more OWL Object Properties and an OWL Data-type Property. This translation depends on the data model schema used to define the data element, as follows (we will use XML terminology in what follows):

If the data element corresponds to XML element with Simple Type that is part of an enclosing Complex Type that is global, then the enclosing element is translated to the OWL Class and the simple-type element is translated to the OWL Data-type Property, while preserving the names on both.

If the data element corresponds to XML element with Simple Type that is part of an enclosing Complex Type, and the enclosing element is part of another enclosing Complex Type (which itself could be nested ad nauseam), then: the root (i.e. global) complex-type is translated to an OWL Class, each of the nested complex-types is translated to an Object Property, and the leaf simple-type is translated to the Data-type Property.

A Data Element is embedded into a SWRL rule as a Class Atom and one or more Property Atoms per the translation above, in the antecedent of the rule. Moreover, a Property Atom corresponding to a Data Element may appear in the conclusion of a SWRL rule, if the value is being written as an outcome of some step.

In step 130, Operator primitives are translated into SWRL built-ins (either standard or custom), and are embedded in the antecedent of rules.

Lastly, in step 135, a Conclusion primitive is translated to a well-known Data-type Property of String type. The value of the Property may carry, for example, messages/alerts/etc. that are to be communicated to a human operator. The Data-type Property is associated with an OWL Individual that corresponds to the network element with which the message/alert is associated. Conclusion primitives are represented as Property Atoms in the conclusions of SWRL rules.

The procedure 100 ends in step 140. Note that the values of Property Atoms corresponding to Collection and Conclusion primitives may embed/use the values of Data Element and Parameter artifacts simply by leveraging SWRL's string concatenation built-in (e.g., such as "IF", "EQUALS", etc.) Note also that the chaining of Start, Parameter, Collection, Operator, and Conclusion primitives using "links" in the graphical user interface determines how the SWRL artifacts are grouped together in rules.

Figure 2:
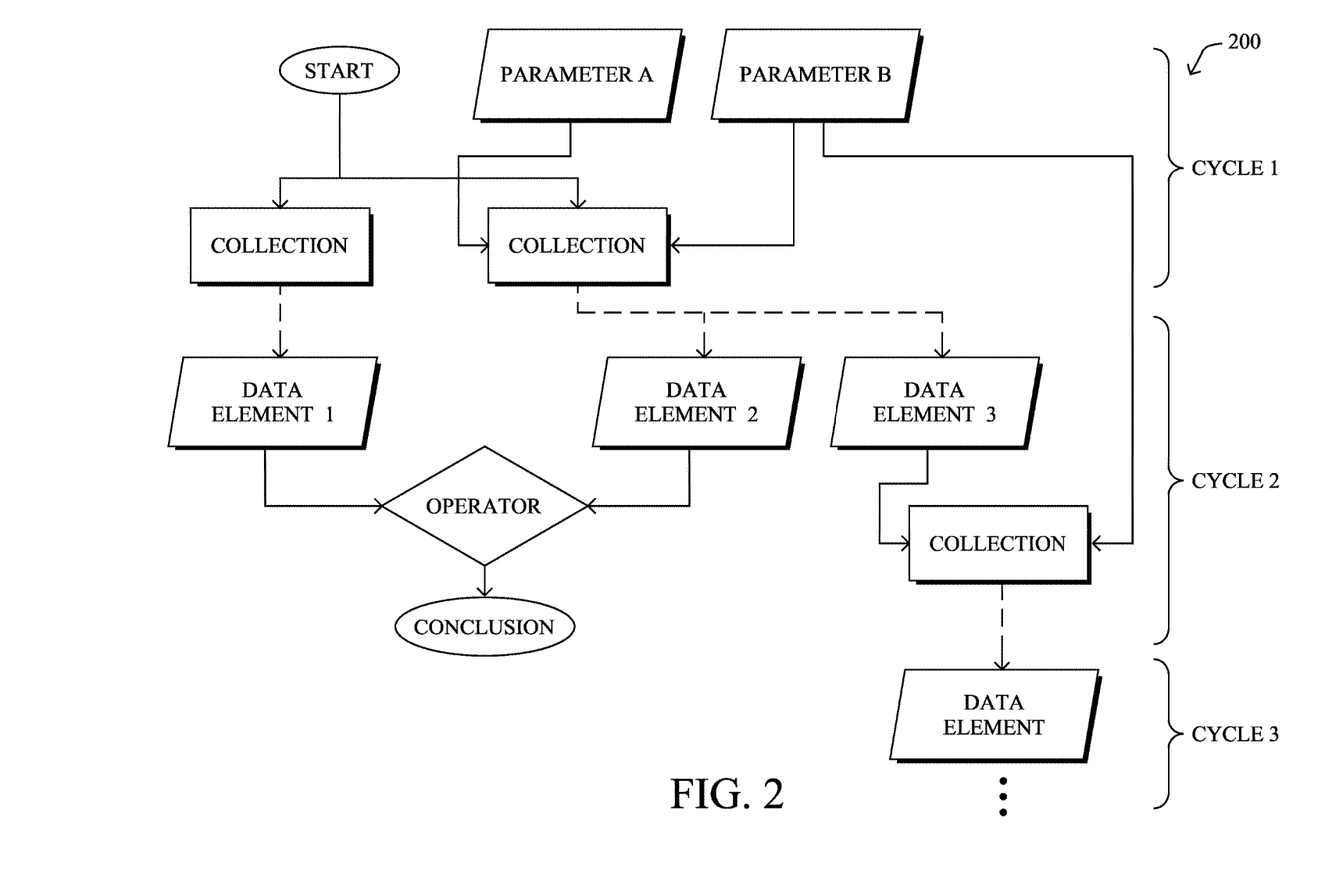
FIG. 2 illustrates an example flowchart/algorithm that may be translated by the semantic knowledgebase authoring tool.

An example of this is shown in FIG. 2, where an example flowchart/algorithm 200 takes two parameters "A" and "B" as input and shows various operations (e.g., collection, operator, conclusion, etc.) on three Data Elements "1", "2", and "3". This flow-chart may be translated by the system described herein to an OWL ontology with three SWRL rules (for cycles 1 and 2 only). Note that while the captions in the diagram show generic "Collection, Data Element, etc." captions, more descriptive terms would be used in a production system. For example, one Data Element could be "Interface IP Address" or another could be "BGP Peer Address", etc.

——Optimal Rule Generation from a Digraph Representation——

Though the illustrative authoring tool described above can be used to translate expert knowledge into semantic knowledgebases for automating computing systems, it is further important to note that such an authoring system needs to be able to generate from a directed graph (digraph) representation of a workflow the corresponding rules (e.g., SWRL rules) for the knowledgebase. The problems to solve are thus:

Determining the breakdown of the overall workflow into a candidate rule set.

Identifying the subset of unique productions in the above set.

For each rule, determining the minimal number of condition checks that need to form the rule body, and the conclusions/inferences that form the rule head.

The techniques herein, therefore, define a mechanism for generating the optimal number of rules from such a digraph. In particular, the techniques herein are directed to a mechanism for generation of minimal number of distinct rules in a knowledgebase from a digraph representation of a workflow, through identifying chains that map to candidate rules, merging chains that intersect over decision points in the graph, and mapping the resulting minimal set to conjunctive rules.

Specifically, according to one or more embodiments of the disclosure as described in detail below, a computing system identifies one or more terminal nodes in a digraph, and then back-walks primitives up the digraph from each terminal node to a corresponding parent terminal node or a root of the digraph, whichever is first. The system then identifies chains of back-walked primitives for each of the one or more terminal nodes (e.g., where each chain consists of a respective terminal node and any primitives either a) up to but not including a corresponding parent terminal node or else b) up to and including the root of the digraph when the back-walking reaches the root). Based on this, the system can then merge each set of any two or more chains of the identified chains that intersect on a decision operation into a corresponding new single chain, and maps each of the chains to a respective rule, wherein one or more terminal nodes in each particular chain map to a head of a corresponding rule, and other primitives of the particular chain map to a body of the corresponding rule.

Operationally, as a starting point, the digraph is assumed to consist of a small set of graphical elements (or primitives) that correspond to different stages of a flowchart or workflow, for example (and as also mentioned above):

Start primitive, marks the starting point of some algorithm;

Parameter primitive, represents some input into the algorithm;

Collection primitive (e.g. that triggers a specific command/CLI/etc.);

Data Element primitive that corresponds to collected data or inferred data;

Operator primitive that allows for performing logical, arithmetic or string manipulations and decisions (etc.) over Data Elements; and Conclusion primitive that can, for example, raise an alert to the operator or issue a command to trigger an action.

Again, the above primitives are meant to be representative, and it is to be understood that variations thereof are possible and do not affect the operation of the mechanism defined in this disclosure.

For the purpose of the discussion herein, primitives that result in some action are considered terminal nodes (e.g., inferred Data Element, Collection, and Conclusion primitives in the above list). Note that terminal nodes need not be leaf nodes in the digraph.

Figure 3:
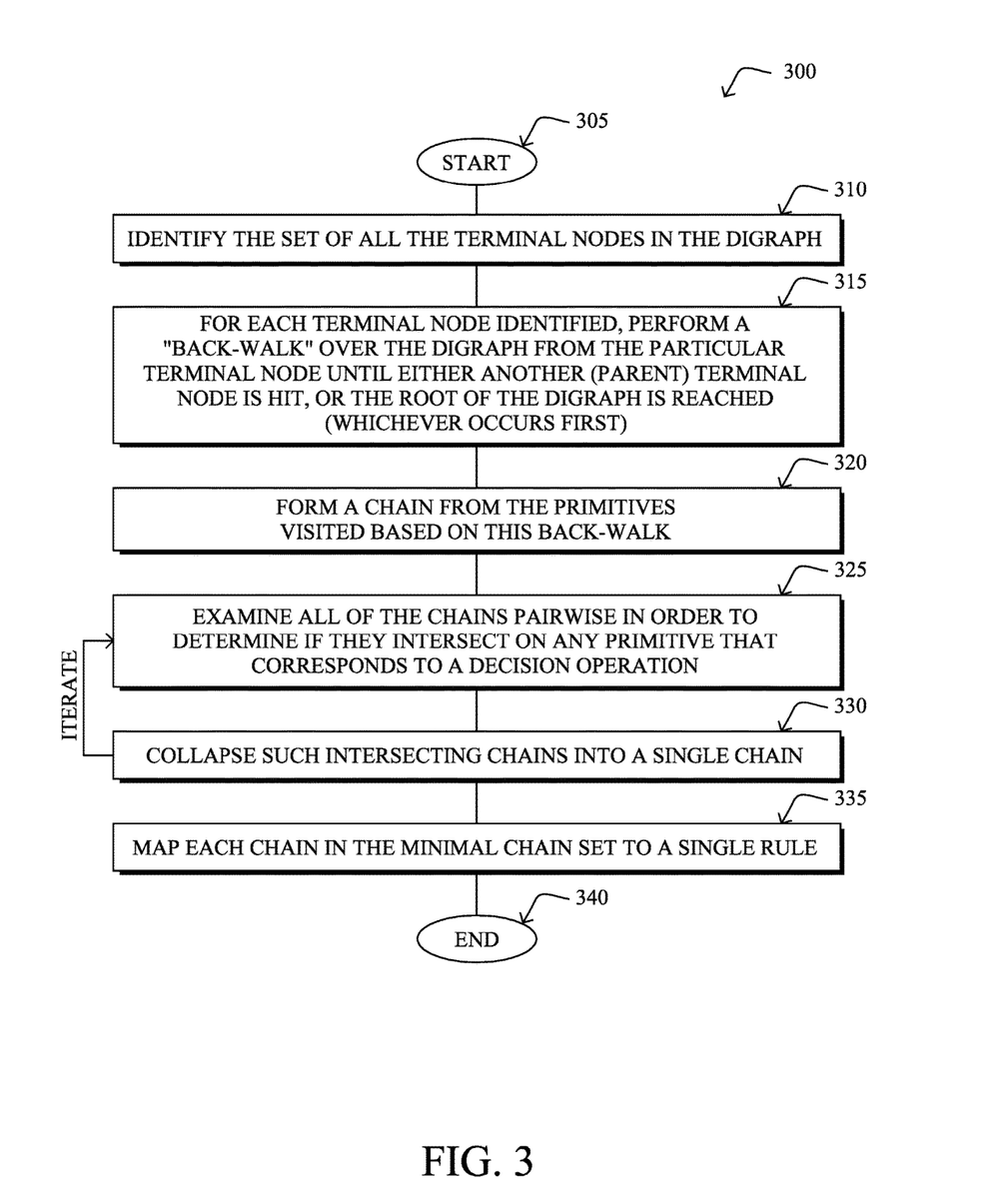
FIG. 3 illustrates an example simplified procedure for optimal rule generation from a digraph representation.
Figure 4:
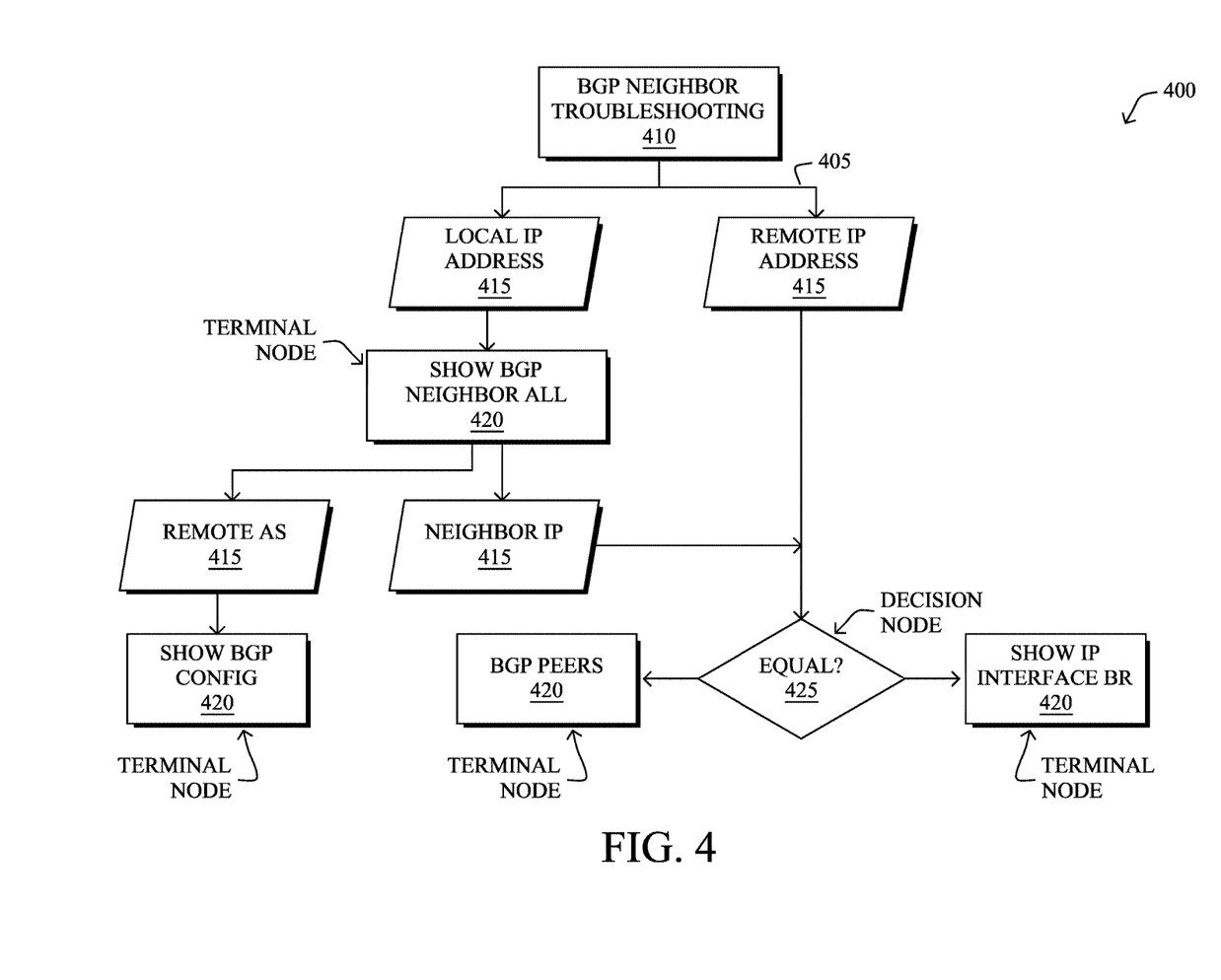
FIG. 4 illustrates an example digraph representation of an example algorithm.
Figure 5:
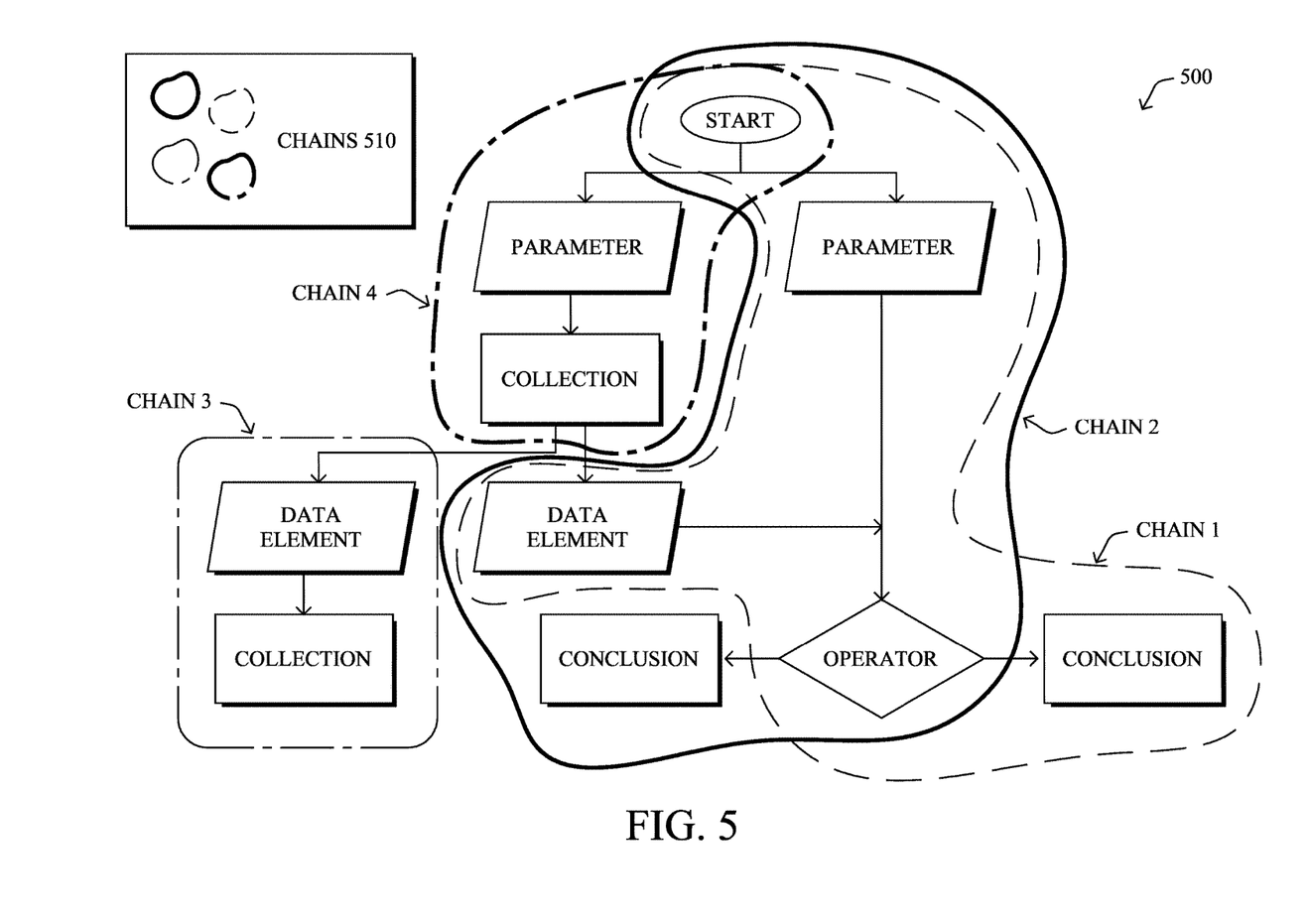
FIG. 5 illustrates an example of optimal rule generation from the example digraph representation of the example algorithm in FIG. 4.

FIG. 3 illustrates an example simplified procedure for optimal rule generation from a digraph representation in accordance with one or more embodiments described herein. With reference generally to FIGS. 4-5 (described below), the procedure 300 may start at step 305, and continues to step 310, where the system identifies the set of all the terminal nodes in the digraph. The cardinality of this set is equal to that of the candidate rule set (before any optimization).

For each terminal node identified, in step 315 the system performs a "back-walk" over the digraph from the particular terminal node until either another (parent) terminal node is hit, or the root of the digraph is reached (whichever occurs first). Notably, "back-walking", in general, implies traversing a digraph in a reverse order than the intended order of the digraph. For instance, if a digraph simply consists of operations 1, 2, and then 3, in that order, then back-walking this digraph would result in looking at the operations in the order of 3, 2, and then 1. Alternatively, a digraph with branches, such as 1, 2, and then either 3 OR 4, would result in two back-walked paths: a) 3, 2, 1, and also b) 4, 2, 1.

In step 320, a chain is formed from the primitives visited based on this back-walk, which in the former case excludes the parent terminal node and in the latter case includes the digraph root. This chain maps to a candidate rule in the rule-base. The reason why parent terminal nodes are excluded from the end of a chain is because they will form the start of their own chain.

In step 325, the system then examines all of the chains (which were identified in step 315) pairwise in order to determine if they intersect on any primitive that corresponds to a decision operation (e.g., Operator primitives in the above list). In step 330, two such intersecting chains are collapsed into a single chain that is the union of their two sub-digraphs. Iterating these steps (325-330) until complete results in a minimal number of chains that can be mapped to unique productions in the rule base. Note that chains may intersect at primitives that do not correspond to decision operations (e.g., on Parameters, or Data Elements, etc.), however the associated chains must not be collapsed based on such intersections.

In the final step 335, each chain in the minimal chain set (derived in step 330) is mapped to a single rule, with the terminal node in the chain mapping to the rule's head and other (e.g., all other) primitives mapping to the rule's body. The mapping algorithm can use, in one embodiment, the conversion rules described above.

The procedure 300 ends in step 340. Given the fact that SWRL rules are conjunctive, and that SWRL built-ins can only occur in rule body, the resulting generated rule base, after running this operation, will be optimal: it will have the minimal number of unique rules/productions.

FIG. 4 illustrates an example digraph representation 400 of an example algorithm, such as for border gateway protocol (BGP) neighbor troubleshooting (a computer networking workflow) with the terminal and decision nodes highlighted. In particular, a starting or "root" node 410 begins the algorithm, with various primitives leading down the algorithm (e.g., a decision tree) interconnected by links or edges 405. For example, the digraph 400 may contain various parameters 415 terminal nodes 420 (e.g., commands, conclusions, etc.), and decision nodes 425 (e.g., operators), but other primitives (e.g., data elements, streams, queries, etc.) may also be used in any digraph representation according to the desired workflow.

In this example, and as shown now with reference to FIG. 5, four chains 510 will be constructed by the mechanisms described above. (Note that FIG. 5 depicts the same example algorithm 400 of FIG. 4, i.e., the BGP Neighbor troubleshooting example, but shows the taxonomy 500 of the various nodes and the associated chains.) Chain 1 and Chain 2 will be merged by the procedure described above, whereas Chain 3 and Chain 4 will not. This example algorithm will result in the generation of three distinct rules, one for merged Chain 1-2, one for Chain 3, and another for Chain 4. Clearly, the chains created may be simple chains, or else may grow to great complexities depending upon the underlying digraph. By starting from conclusions (terminal nodes from a directed graph (e.g., digraph created on a GUI), the techniques herein thus determine what chain of primitives are needed to reach that conclusion, and bases the translated rules on that determination, merging multiple chains into single rules where possible in order to generate an optimal number of rules (e.g., for storage in a rule database).

The techniques described herein, therefore, provide for optimal rule generation from a digraph representation. In particular, the techniques herein produce the minimal (most optimal) number of unique rules in a knowledgebase. Notably, existing graphical ontology editors make no claims on the optimality of the generated rule base. Additionally, the techniques herein create rules that are a chain of nodes in the digraph (i.e., digraph to rules), and truly capture knowledgebase with digraphs that are a graphical representation of a workflow/algorithm.

Furthermore, the techniques herein help reduce the amount of storage/disk space used to store rules for a knowledgebase. For instance, based on analysis, a single example rule requires 50 KB of disk space on average (and some rules are over 80 KB in size). A typical workflow may require anywhere between 15 and 25 rules (when the rules are optimized). This means that an ontology file with a single workflow roughly requires 1 MB of storage. With the techniques herein, the amount of storage required may be between 15% and 50% less than a non-optimal solution, depending on the nature of the workflow represented in the digraph.

While there have been shown and described illustrative embodiments that provide for a semantic knowledgebase authoring tool for automating computing systems and optimal rule generation from a digraph representation, it is to be understood that various other adaptations and modifications may be made within the spirit and scope of the embodiments herein. For example, the embodiments have been shown and described herein with relation to specific languages or standards (e.g., an ontology of the digraph based on OWL, rules based on SWRL, etc.). However, the embodiments in their broader sense are not as limited, and may, in fact, be used with other types of semantic ontologies and/or rules. In addition, while the techniques have been shown using an example for computer networking-based workflows, other types of workflows may be modeled, translated, and optimized, accordingly. That is, while the embodiments described herein are centered around networking use-cases, the system can be used to automate any distributed computer system, and can be used, for example, to automate Cloud operations, virtual machine (VM) placements, Product/Solution testing, and so on.

Illustratively, the techniques described herein may be performed by hardware, software, and/or firmware, such as in accordance with an "authoring tool" process and/or "rule generation" process, which may contain computer executable instructions executed by a processor (or other suitable processing device) to perform functions relating to the techniques described herein, e.g., in conjunction with one another or separately.

Figure 6:
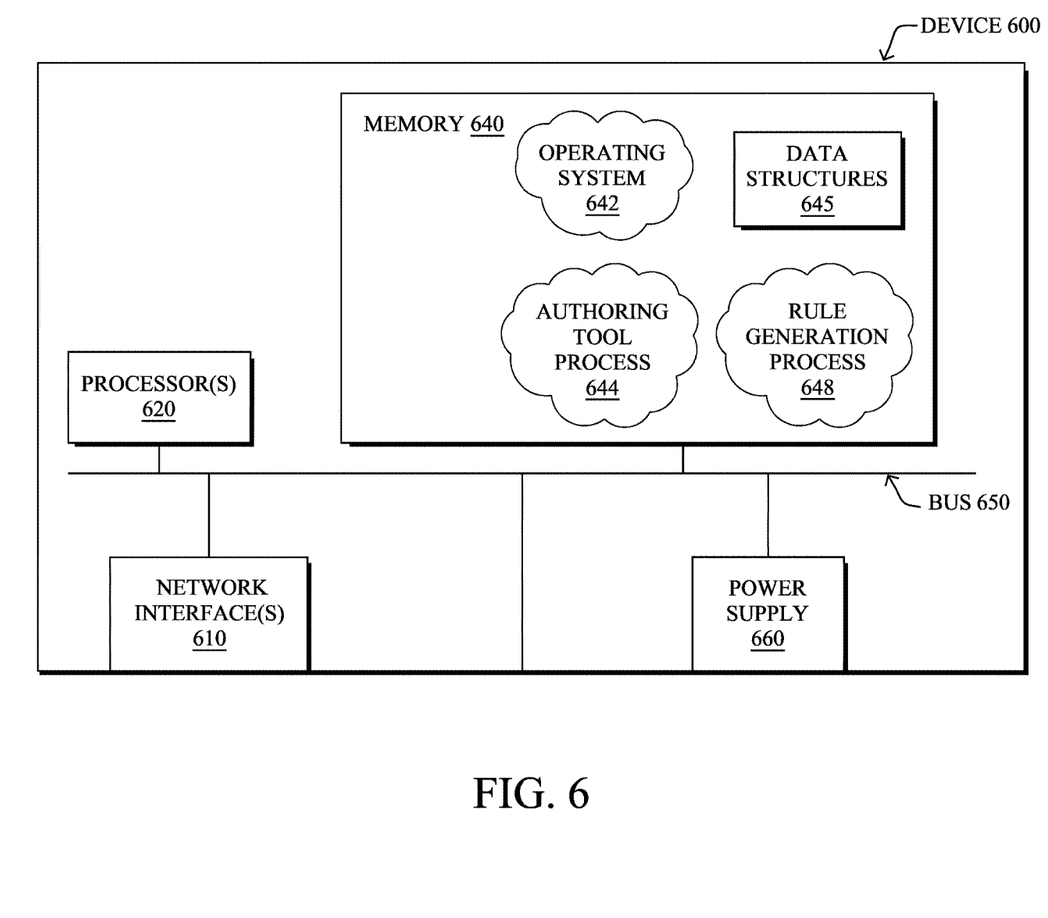
FIG. 6 illustrates an example computing device for knowledgebase authoring and is optimal rule generation from a digraph representation.

FIG. 6 is a schematic block diagram of an example computing device 600 that may be used with one or more embodiments described herein. The device may comprise one or more network interfaces 610, least one processor 620, and a memory 640 interconnected by a system bus 650, as well as a power supply 660 (e.g., battery, plug-in, etc.). The network interface(s) 610 contain the mechanical, electrical, and signaling circuitry for communicating data over links coupled to a network.

The memory 640 comprises a plurality of storage locations that are addressable by is the processor 620 for storing software programs and data structures associated with the embodiments described herein. The processor 620 may comprise hardware elements or hardware logic adapted to execute the software programs and manipulate the data structures 645. An operating system 642, portions of which are typically resident in memory 640 and executed by the processor, functionally organizes the device by, among other things, invoking operations in support of software processes and/or services executing on the device. These software processes and/or services may comprise an illustrative authoring tool process 644 and rule generation process 648.

It will be apparent to those skilled in the art that other processor and memory types, including various computer-readable media, ASICs, FPGAs, etc., may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 7:
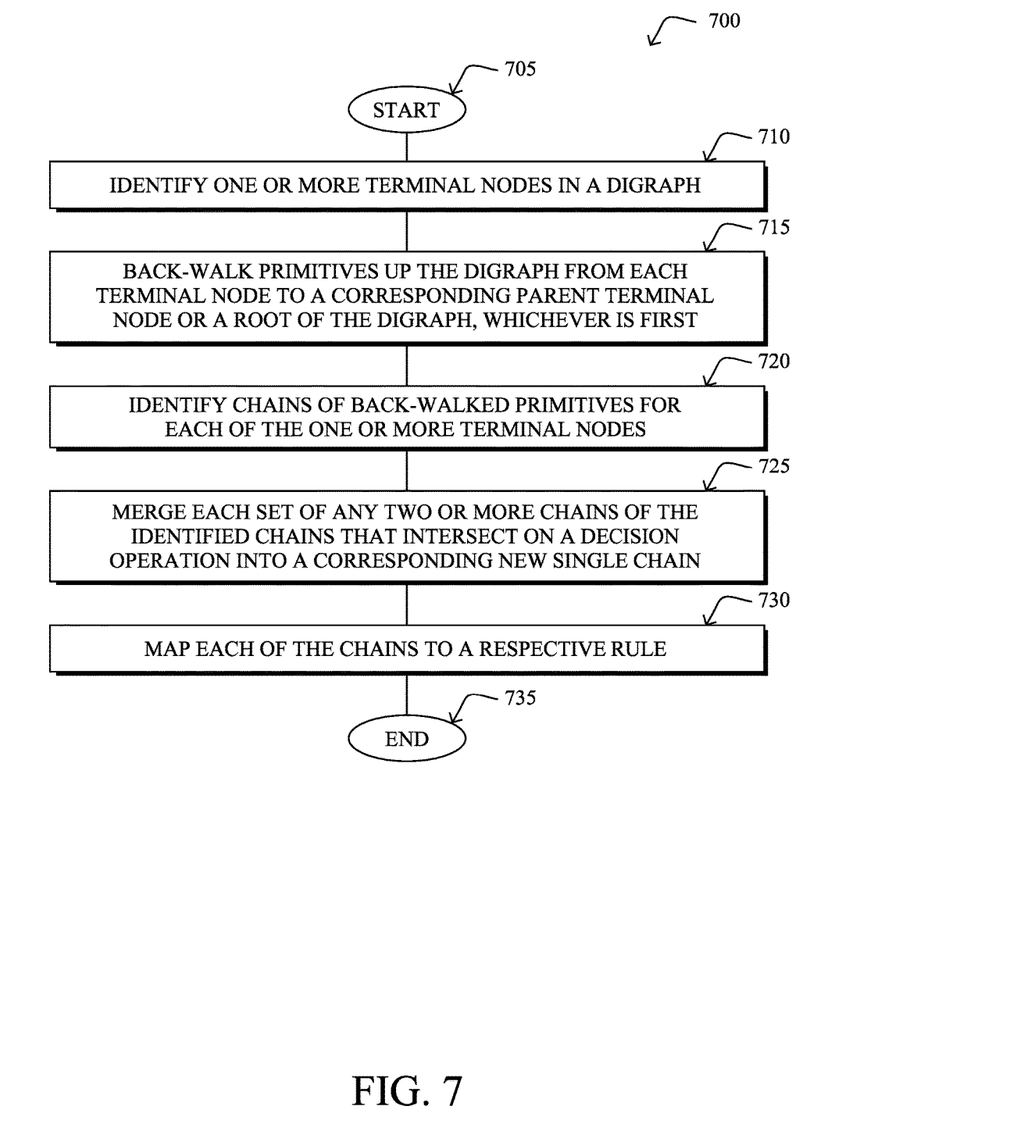
FIG. 7 illustrates another example simplified procedure for optimal rule generation from a digraph representation.

Rule generation process 648, in particular, contains computer executable instructions that may be executed by the processor 620 to perform functions related to the techniques herein. For instance, FIG. 7 illustrates another example simplified procedure for optimal rule generation from a digraph representation that may be performed by the illustrative rule generation process 648 in accordance with one or more embodiments described in greater detail above (e.g., similar to procedure 300 in FIG. 3). The procedure 700 may start at step 705, and continues to step 710, where, based on a digraph (e.g., a user-created graphical flowchart of a workflow) the process 648 identifies one or more terminal nodes in a digraph (e.g., determining primitives in the digraph that result in an action). The process may then back-walk primitives up the digraph in step 715 from each terminal node to a corresponding parent terminal node or a root of the digraph, whichever is first. After identifying chains of back-walked primitives in step 720 for is each of the one or more terminal nodes (where each chain consisting of a respective terminal node and any primitives up to but not including a corresponding parent terminal node or else up to and including the root of the digraph, depending on the back-walking), then in step 725 the process may merge each set of any two or more chains of the identified chains that intersect on a decision operation into a corresponding new single chain (e.g., iteratively examining pairwise each chain to determine whether there is an intersection between two chains on a decision operation, such as an operation primitive). Lastly, in step 730, the process may map each of the chains to a respective rule, where one or more terminal nodes in each particular chain map to a head of a corresponding rule, and other (e.g., all other) primitives of the particular chain map to a body of the corresponding rule. The procedure 700 then ends in step 735.

It should be noted that while certain steps within procedures 100, 300, and 700 may be optional as described above, the steps shown in FIGS. 1, 3, and 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 100, 300, and 700 are described separately, certain steps from each procedure may be incorporated into each other procedure, and the procedures are not meant to be mutually exclusive.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments is herein.

What is claimed is:

1. A computer-implemented method, comprising:
identifying, by a processor, one or more terminal nodes in a digraph, wherein a terminal node is a primitive that results in an action within a rule;
back-walking primitives up the digraph from each terminal node to a corresponding parent terminal node or a root of the digraph, whichever is first;
identifying chains of back-walked primitives for each of the one or more terminal nodes, wherein based on the chain having a parent terminal node, each chain consists of a respective terminal node and any primitives up to but not including a corresponding parent terminal node, and wherein based on the chain not having parent terminal node, each chain consists of up to and including the root of the digraph when the back-walking reaches the root;
merging, into a corresponding new single chain, each set of any two or more chains of the identified chains that intersect on a decision operation;
mapping each of the chains to a respective rule, wherein one or more terminal nodes in each particular chain map to a head of a corresponding rule, and other primitives of the particular chain map to a body of the corresponding rule;
constructing a semantic language based on each of the chains of a plurality of rules in the digraph; and
automatically generating a knowledgebase based on the semantic language.

2. The method as in claim 1, wherein each identified chain consists of a respective terminal node and any primitives either a) up to but not including a corresponding parent terminal node, or else b) up to and including the root of the digraph when the back-walking reaches the root.

3. The method as in claim 1, wherein the rules are based on a Semantic Web Rule Language (SWRL).

4. The method as in claim 1, wherein an ontology of the digraph is based on a Web Ontology Language (OWL).

5. The method as in claim 1, wherein primitives are selected from a group consisting of: start primitives; parameter primitives; collection primitives; data element primitives; operator primitives; conclusion primitives; query primitives; command primitives; and stream primitives.

6. The method as in claim 1, wherein identifying the terminal nodes comprises:
determining the primitives in the digraph that result in an action.

7. The method as in claim 6, wherein primitives in the digraph that result in an action are selected from a group consisting of: inferred data elements primitives; collection primitives; and conclusion primitives.

8. The method as in claim 1, wherein merging comprises:
iteratively examining pairwise each chain to determine whether there is an intersection between two chains on a decision operation.

9. The method as in claim 1, wherein the decision operation comprises an operation primitive.

10. The method as in claim 1, wherein the digraph is a user-created graphical flowchart of a workflow.

11. The method as in claim 1, wherein the digraph represents a computer network based workflow.

12. A tangible, non-transitory, computer-readable media having software encoded thereon, the software when executed by a processor operable to:
identify one or more terminal nodes in a digraph, wherein a terminal node is a primitive that results in an action within a rule;
back-walk primitives up the digraph from each terminal node to a corresponding parent terminal node or a root of the digraph, whichever is first;
identify chains of back-walked primitives for each of the one or more terminal nodes, wherein based on the chain having a parent terminal node, each chain consists of a respective terminal node and any primitives up to but not including a corresponding parent terminal node, and wherein based on the chain not having parent terminal node, each chain consists of up to and including the root of the digraph when the back-walking reaches the root;
merge, into a corresponding new single chain, each set of any two or more chains of the identified chains that intersect on a decision operation;
map each of the chains to a respective rule, wherein one or more terminal nodes in each particular chain map to a head of a corresponding rule, and other primitives of the particular chain map to a body of the corresponding rule;
construct a semantic language based on each of the chains of a plurality of rules in the digraph; and
automatically generate a knowledgebase based on the semantic language.

13. The computer-readable media as in claim 12, wherein each identified chain consists of a respective terminal node and any primitives either a) up to but not including a corresponding parent terminal node, or else b) up to and including the root of the digraph when the back-walking reaches the root.

14. The computer-readable media as in claim 12, wherein the rules are based on a Semantic Web Rule Language (SWRL).

15. The computer-readable media as in claim 12, wherein an ontology of the digraph is based on a Web Ontology Language (OWL).

16. The computer-readable media as in claim 12, wherein primitives are selected from a group consisting of: start primitives; parameter primitives; collection primitives; data element primitives; operator primitives; conclusion primitives; query primitives; command primitives; and stream primitives.

17. The computer-readable media as in claim 12, wherein the software when executed to identify the terminal nodes is further operable to:
determine the primitives in the digraph that result in an action.

18. The computer-readable media as in claim 17, wherein primitives in the digraph that result in an action are selected from a group consisting of: inferred data elements primitives; collection primitives; and conclusion primitives.

19. The computer-readable media as in claim 12, wherein the software when executed to merge is further operable to:

iteratively examine pairwise each chain to determine whether there is an intersection between two chains on a decision operation.

20. An apparatus, comprising:
a processor adapted to execute one or more processes; and
a memory configured to store a process executable by the processor, the process when executed operable to:
identify one or more terminal nodes in a digraph, wherein a terminal node is a primitive that results in an action within a rule;
back-walk primitives up the digraph from each terminal node to a corresponding parent terminal node or a root of the digraph, whichever is first;
identify chains of back-walked primitives for each of the one or more terminal nodes, wherein based on the chain having a parent terminal node, each chain consists of a respective terminal node and any primitives up to but not including a corresponding parent terminal node, and wherein based on the chain not having parent terminal node, each chain consists of up to and including the root of the digraph when the back-walking reaches the root;
merge, into a corresponding new single chain, each set of any two or more chains of the identified chains that intersect on a decision operation;
map each of the chains to a respective rule, wherein one or more terminal nodes in each particular chain map to a head of a corresponding rule, and other primitives of the particular chain map to a body of the corresponding rule; and
construct a semantic language based on each of the chains of a plurality of rules in the digraph; and
automatically generate a knowledgebase based on the semantic language.

\* \* \* \* \*

UNITED STATES PATENT AND TRADEMARK OFFICE
CERTIFICATE OF CORRECTION

PATENT NO. : 9,910,642 B2
APPLICATION NO. : 15/165369
DATED : March 6, 2018
INVENTOR(S) : Samer Salam et al.

It is certified that error appears in the above-identified patent and that said Letters Patent is hereby corrected as shown below:

In the Specification

In Column 1, Line 27, please amend as shown:
is the ease by which these detailed and potentially In Column 1, Line 64, please amend as shown:
knowledgebase authoring and optimal rule generation In Column 3, Line 47, please amend as shown:
elements (or managed objects) to be fetched from the In Column 7, Line 60, please amend as shown:
tions that are addressable by the processor 620 for storing In Column 8, Line 34, please amend as shown:
chains of black-walked primitives in step 720 for each of In Column 9, Line 11, please amend as shown:
embodiments herein.

Signed and Sealed this
Eighth Day of December, 2020

Andrei Iancu
*Director of the United States Patent and Trademark Office*